Oct. 12, 1937.                J. A. MILLS                2,095,556
                           HELICOPTER AEROPLANE
                           Filed May 21, 1935
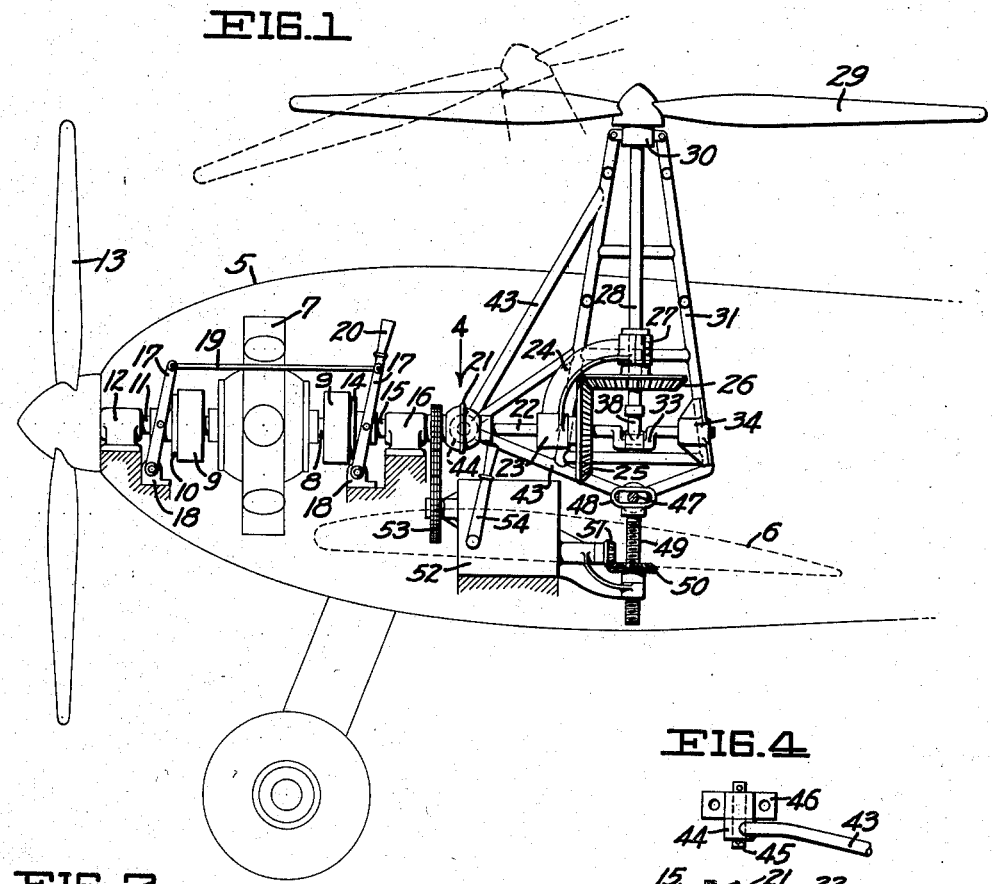
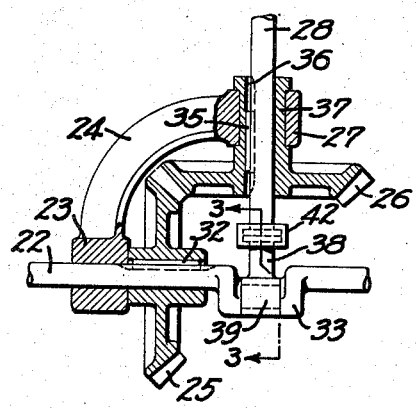
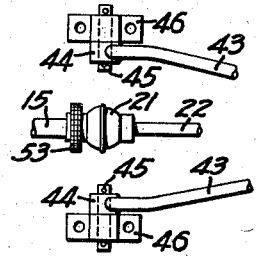
INVENTOR
JAMES A. MILLS
BY
Harry C. Schroeder
HIS ATTORNEY Patented Oct. 12, 1937

2,095,556

UNITED STATES PATENT OFFICE 2,095,556

HELICOPTER AEROPLANE

James A. Mills, San Francisco, Calif.

Application May 21, 1935, Serial No. 22,566

12 Claims. (Cl. 244—17)

My invention relates to aircraft of the helicopter type, wherein the craft is provided with propellers for effecting both forward and vertical movement thereof, and particularly to the construction and operation of the mechanism for effecting the vertical lift.

An important object of my invention is to provide means whereby the relationship of the axis of thrust of the lifting propeller, with respect to the longitudinal axis of the craft, may be varied as desired.

Another object of my invention is to provide, in combination with a lifting propeller whose axis of thrust may be varied angularly with the horizontal axis of the craft, means for reciprocating the propeller along its thrust axis so that, during reciprocations thereof an increased thrust of the propeller on the air is obtained.

Another object of my invention is to provide means whereby selective operation of either the traction propeller or the lifting propeller may be obtained.

Referring to the drawing:

Figure 1 is a side elevation of mechanism incorporating my invention as applied to an aeroplane; the parts thereof being shown in light lines.

Figure 2 is a vertical sectional view of a portion of the rotating and reciprocating mechanism of the lifting propeller.

Figure 3 is a fragmental view, partly in section and partly in elevation, of a portion of the reciprocating mechanism. The plane of section is indicated by the line 3—3 of Figure 2.

Figure 4 is a fragmentary plan view of a portion of the mechanism. The view is taken looking in the direction of the arrow 4 of Figure 1.

Applicant has chosen to use the terms "traction propeller" and "lifting propeller" throughout this specification to identify, according to function, the two propellers used on the craft. The traction propeller is that mounted with its thrust axis parallel with the axis of the ship so that its force will be utilized to move the ship horizontally through the air, and the lifting propeller is that which is mounted above the ship with its thrust axis disposed in a vertical plane so that the energy derived therefrom may be made to lift the ship vertically through the air.

In detail, the mechanism of my invention is shown as mounted in an aeroplane having a fuselage 5 provided with a suitable wing 6, and a motor 7.

The shaft 8 of the motor is extended on both sides thereof and each end has mounted thereon one section of a friction clutch 9. The cooperating section 10 of the left hand clutch is connected with a short shaft 11, which is journalled in a bearing 12 and is secured in the hub of a traction propeller 13, and the section 14 of the right hand clutch is mounted on a shaft 15 which is provided with a bearing 16. A pair of levers 17, each having a fixed fulcrum 18, are pivotally secured to the sections 10 and 14 of the clutches, and a tie rod 19 is provided for securing the levers together. A handle 20 is provided on the right hand lever 15 so that by movement of the latter a corresponding movement is imparted to the lever 17. The clutches are so arranged that, upon movement of the handle 20 toward the nose of the ship, the left hand clutch is engaged and the right hand clutch disengaged, and upon movement of the handle away from the nose of the ship the left hand clutch is disengaged and the right hand clutch is engaged. Thus it will be seen that either the shaft 15 or the traction propeller shaft 11 may be selectively connected to the motor.

The shaft 15, after passing through the bearing 16, is connected to one section of a universal joint 21, and the other section of the joint is secured to a shaft 22, coextensive with the shaft 21, which is journalled in the hub 23 of an arcuate bracket 24. A bevel gear 25 is fixed to the end of the shaft 22 and is meshed with a similar bevel gear 26 journalled in the hub 27 of the bracket 24 and mounted on a vertical shaft 28, to the upper end of which is secured the lifting propeller 29. A bearing 30 mounted on a tubuler frame 31 is provided for supporting the upper end of the vertical shaft 28. It will be seen therefore that the lifting propeller 29 is connected for rotation with the motor 7 and at the same speed as that of the traction propeller 13.

Means are provided for increasing the thrust on the air of the lifting propeller. Referring to Figures 1 to 3 inclusive, it will be observed that the shaft 22, after passing through the hub of the gear 25, to which it is secured by means of the key 32, is offset to provide a crank 33 and that the shaft is then extended and journalled in a bearing 34 secured to the frame 31. The crank is positioned so that it lies directly under the axis of the vertical shaft 28. This latter shaft is provided with a key 35 which is slidably mounted in a keyway 36 formed in the hub 37 of the gear 26 so that the shaft 28 is fixed for rotation with the gear but is free to move axially thereof.

The lower end of the vertical shaft is divided to provide an extension 38 which has provided thereon a transversely elongated eye 39 which engages the pin 40 of the crank. The abutting ends of the shafts 28 and 38 are each provided with a flanged head 41 both of which are held together by means of a collar 42. The arrangement of these parts is such that, when the shaft 22 is rotated, rotation will be imparted to the shaft 28 through the gears 25 and 26 and also the shaft 28 will be reciprocated axially in the hub of the gear 26 due to its connection with the crank 33. It will be seen that the division of the lower end of the shaft 28 is provided for permitting rotation of the upper section thereof with respect to the non-rotatable lower section thereof.

Thus it will be seen that the lifting propeller 29 will be reciprocated vertically at a speed equal to that of its rotation and, due to this reciprocation the thrust of the propeller on the air during its downward stroke will be materially increased resulting in greater lifting force.

Means are also provided for varying the angle of the axis of thrust of the lifting propeller with the horizontal axis of the craft. In Figures 1 and 4 it will be observed that the frame 31 is provided with tubular arms 43 which extend forwardly thereof to junctions at a pair of eyes 44. These eyes are journalled on pins 45, which are secured in fixed brackets 46, and are so located that their axes lie in alinement with the pivot point of the universal joint 21.

The lower portion of the frame 31 is provided with a pin 47 which is engaged by the elongated eye 48 of a vertically disposed jack screw 49. A bevel gear 50 is provided having its hub threaded to match the threads of the jack screw and is connected for rotation with the motor through a pinion 51, a clutch and reverse gear mechanism 52, and a sprocket and chain drive 53 which connects with the shaft 15 just forward of the universal joint 21. An operating lever 54 is provided for actuating the clutch and the reverse gear so that the jack screw may be power driven in either direction of rotation.

It will be observed that since the lifting propeller frame is pivoted for movement about the pivot point of the universal joint 21 the entire frame and its associated parts may be moved vertically and, since the pivot point thereof is offset with respect to the axis of the vertical shaft 28, the angle of the latter, with respect to the horizontal axis of the aeroplane, may be varied as shown, in one position, by the dotted lines of Figure 1. The power means, represented by the jack screw 49, is provided for accomplishing this variation in the angular setting of the lifting propeller since, due to the gyroscopic action of the propeller when rotating, this setting would be impossible to obtain by manually powered means.

It will be seen therefore, in view of the foregoing description, that I have provided means in a helicopter aeroplane for increasing the thrust of the lifting propeller and by means of the mechanism for varying the angle of thrust thereof with respect to the line of flight of the aeroplane, I have provided, by tilting the axis of thrust of the lifting propeller forward toward the nose of the craft, so that the propeller will impart both lift and forward movement thereto, for a permissible decrease in the gliding angle of the craft without the danger of stalling due to lack of flying speed, and, by tilting the axis of thrust rearwardly of the craft, I have provided means whereby, due to the drag set up by the lifting propeller, a material decrease in the landing speed of the plane may be obtained.

I claim:

1. In a helicopter aircraft, a motor having an axially disposed shaft with its ends projecting from the motor at opposite sides thereof, a traction propeller having a driving shaft mounted adjacent to one of the projecting ends of the motor shaft and in alignment therewith, a driven shaft adjacent to the other end of the motor shaft and in alignment therewith, a lifting propeller, a shaft for the lifting propeller disposed at right angles with respect to the driven shaft, means carried by said driven shaft for supporting said lifting propeller and its shaft, means operated by said driven shaft for imparting rotative movement to the shaft of the lifting propeller, means also operated by the driven shaft for reciprocating the lifting propeller axially with respect to its shaft and also with respect to the plane of said driven shaft, and means for selectively connecting the traction propeller shaft and said driven shaft with said motor shaft.

2. In a helicopter aircraft, a motor having a drive shaft, a traction propeller operatively connected with said driving shaft, a driven shaft operatively connected with said drive shaft and having a section which is angularly adjustable with respect to the rest of said driven shaft, a supporting frame carried by said adjustable section of the driven shaft, a lifting propeller having a shaft rotatably mounted in said supporting frame, means connected with the movable section of the driven shaft for rotating the lifting propeller shaft, and simultaneously reciprocating the lifting propeller axially with respect to its shaft, means actuated by said driven shaft for changing the angular relation of the movable section of the driven shaft with respect to the other portion of said last mentioned shaft, and means for selectively connecting the traction propeller shaft and said driven shaft with the motor shaft.

3. In a helicopter aircraft, a motor having a driving shaft, a traction propeller, a driven shaft in axial alignment with the motor shaft, said driven shaft being formed of two sections, one of which sections is adjustably connected to the other section of the driven shaft by a universal joint so as to be angularly adjustable in all directions, a supporting frame mounted on the adjustable section of the driven shaft, a lifting propeller provided with a shaft rotatably mounted within said frame, means operated by the driven shaft for imparting rotative movement to the lifting propeller shaft, means for simultaneously reciprocating the lifting propeller axially with respect to its shaft, means also actuated by the driven shaft for adjustably changing the angular relation of the movable section of the driven shaft, and means for selectively connecting the traction propeller shaft and said driven shaft with the motor shaft.

4. In a helicopter aircraft, a motor having a driven shaft, a traction propeller, a driven shaft in axial alignment with the motor shaft, said driven shaft being formed of two sections, one of which is angularly adjustable with respect to the other, a supporting frame carried by the adjustable section of the driven shaft and provided with bearings for said shaft, said supporting frame also having bearings disposed at right angles to said adjustable section, a vertically disposed lifting propeller shaft rotatably mounted in the last mentioned bearings and provided with a propeller, intermeshed gearing carried by the respective shafts and driven by the driven shaft, means operatively connecting the movable section of the driven shaft with the shaft of the lifting propeller, said means being constructed and arranged to reciprocate the propeller axially with respect to its shaft, an adjusting member for said frame, and means operated by the driven shaft for actuating said adjusting member.

5. In a helicopter aircraft, a motor having a driving shaft, a traction propeller, a driven shaft in axial alignment with the motor shaft, said driven shaft consisting of two parts operatively connected by a universal joint, so that one section is angularly adjustable in all directions with respect to the other section, a supporting frame carried by the adjustable section of the driven shaft and provided with bearings for said shaft, said supporting frame also having bearings disposed at right angles to said adjustable section, a vertically disposed lifting propeller shaft rotatably mounted in the last mentioned bearings and provided with a propeller shaft, intermeshed gearing carried by the respective shafts and driven by the driven shaft, means operatively connecting the movable section of the driven shaft with the shaft of the lifting propeller, said means being constructed and arranged to reciprocate the propeller axially with respect to its shaft, an adjusting member for said frame, and means operated by the driven shaft for actuating said adjusting member.

6. In a helicopter aircraft, a motor having an axially disposed shaft with its ends projecting from the motor at opposite sides thereof, a traction propeller having a driving shaft mounted adjacent to one of the projecting ends of the motor shaft and in alignment therewith, a driven shaft adjacent to the other end of the motor shaft and in alignment therewith, a lifting propeller, a shaft for the lifting propeller disposed at right angles with respect to the driven shaft, means carried by said driven shaft for supporting said lifting propeller and its shaft, means operated by said driven shaft for imparting rotative movement to the shaft of the lifting propeller, a crank carried by the adjustable section of the driven shaft, means connecting said crank with the lifting propeller shaft in such manner as to reciprocate the lifting propeller with respect to the plane of the driven shaft, and means for selectively connecting the traction propeller shaft and said driven shaft with said motor shaft.

7. In a helicopter aircraft, a motor having a drive shaft, a traction propeller operatively connected with said driving shaft, a driven shaft operatively connected with said drive shaft and having a section which is angularly adjustable with respect to the rest of said driven shaft, a supporting frame carried by said adjustable section of the driven shaft, a lifting propeller having a shaft rotatably mounted in said supporting frame, means connected with the movable section of the driven shaft for rotating the lifting propeller shaft, a crank shaft carried by the movable section of the driven shaft and operatively connected with the adjacent end of the lifting propeller shaft so as to reciprocate the lifting propeller axially with respect to its shaft, means actuated by the driven shaft for changing the angular relation of the movable section of said shaft, and means for selectively connecting the traction propeller and the driven shaft with said motor.

8. In a helicopter aircraft, a motor having a driving shaft, a traction propeller, a driven shaft in axial alignment with the motor shaft, said driven shaft being formed of two sections, one of which is angularly adjustable with respect to the other, a supporting frame carried by the adjustable section of the driven shaft and provided with bearings for said shaft, said supporting frame also having bearings disposed at right angles to said adjustable section, a vertically disposed lifting propeller shaft rotatably mounted in the last mentioned bearings and provided with a propeller, intermeshed gearing carried by the respective shafts and driven by the driven shaft, a crank member carried by the movable section of the driven shaft and operatively engaging the adjacent end of the lifting propeller shaft in such manner as to reciprocate the propeller axially with respect to its shaft, an adjusting member for said frame, and means operated by the driven shaft for actuating said adjusting member.

9. In a helicopter aircraft, a motor having a driving shaft, a traction propeller, a driven shaft in axial alignment with the motor shaft, said driven shaft being formed of two sections, one of which is angularly adjustable with respect to the other, a supporting frame carried by the adjustable section of the driven shaft and provided with bearings for said shaft, said supporting frame also having bearings disposed at right angles to said adjustable section, a vertically disposed lifting propeller shaft rotatably mounted in the last mentioned bearings and provided with a propeller, intermeshed gearing carried by the respective shafts and driven by the driven shaft, means operatively connecting the movable section of the driven shaft with the shaft of the lifting propeller, said means being constructed and arranged to reciprocate the propeller axially with respect to its shaft, a jack screw engaging said frame, means operated by the driven shaft for actuating said jack screw, and means for selectively connecting the traction propeller shaft and said driven shaft with the motor.

10. In a helicopter aircraft, a motor having a driving shaft, a traction propeller, a driven shaft in axial alignment with the motor shaft, said driven shaft being formed of two sections, one of which is angularly adjustable with respect to the other, a supporting frame carried by the adjustable section of the driven shaft and provided with bearings for said shaft, said supporting frame also having bearings disposed at right angles to said adjustable section, a vertically disposed lifting propeller shaft rotatably mounted in the last mentioned bearings and provided with a propeller, intermeshed gearing carried by the respective shafts and driven by the driven shaft, means operatively connecting the movable section of the driven shaft with the shaft of the lifting propeller, said means being constructed and arranged to reciprocate the propeller axially with respect to its shaft, a jack screw provided with an elongated eye, a pin on said frame extended into said eye, means operated by the driven shaft for actuating said jack screw, and means for selectively connecting the traction propeller shaft and said driven shaft with the motor.

11. In a helicopter aircraft, a motor having a driving shaft, a traction propeller, a driven shaft in axial alignment with the motor shaft, said driven shaft being formed of two sections, one of which is angularly adjustable with respect to the other, a supporting frame carried by the adjustable section of the driven shaft and provided with bearings for said shaft, said supporting frame also having bearings disposed at right angles to said adjustable section, a vertically disposed lifting propeller shaft rotatably mounted in the last mentioned bearings and provided with a propeller, intermeshed gearing carried by the respective shafts and driven by the driven shaft, means operatively connecting the movable section of the driven shaft with the shaft of the lifting propeller, said means being constructed and arranged to reciprocate the propeller axially with respect to its shaft, an actuator member engaging said frame, means for axially adjusting said actuator member, and means for selectively connecting the traction propeller and said driven shaft with the motor.

12. In a helicopter aircraft, a motor having an axially disposed shaft provided with ends projecting from opposite sides of the motor, a traction propeller having a driving shaft mounted in alignment with said motor shaft, a driven shaft mounted in alignment with the motor shaft and formed of two sections connected by a universal joint, so that one section is free for angular adjustment with respect to the other section in all directions, a carrier frame mounted on the adjustable section of the driven shaft, a lifting propeller, a shaft for the last mentioned propeller mounted in said frame at right angles to the adjustable section of said driven shaft, means actuated by the driven shaft for imparting rotations to the lifting propeller shaft, a crank member carried by the movable section of the driven shaft and operatively connected to the lifting propeller shaft in such manner as to impart reciprocations to the lifting propeller axially of the shaft, a jack screw movably connected with said supporting frame, a rotative shaft for actuating said jack screw, means operatively connecting the last mentioned shaft and the normally stationary section of the driven shaft, and means for selectively connecting the traction propeller shaft and said driven shaft with the respective ends of the motor shaft.

JAMES A. MILLS.